(12) United States Patent
Fogg et al.

(10) Patent No.: US 9,810,307 B2
(45) Date of Patent: Nov. 7, 2017

(54) FILLER CAM APPARATUS

(71) Applicants: Michael Fogg, Holland, MI (US);
George Herrala, Muskegon, MI (US);
Larry Rillema, Zeeland, MI (US)

(72) Inventors: Michael Fogg, Holland, MI (US);
George Herrala, Muskegon, MI (US);
Larry Rillema, Zeeland, MI (US)

(73) Assignee: Fogg Filler Company, Holland, MI (US)

( * ) Notice: Subject to any disclaimer, the term of this patent is extended or adjusted under 35 U.S.C. 154(b) by 233 days.

(21) Appl. No.: 14/242,950

(22) Filed: Apr. 2, 2014

(65) Prior Publication Data

US 2015/0284121 A1 Oct. 8, 2015

(51) Int. Cl.
*F16H 53/02* (2006.01)
*B67C 3/24* (2006.01)

(52) U.S. Cl.
CPC .......... *F16H 53/025* (2013.01); *B67C 3/246* (2013.01); *Y10T 74/2101* (2015.01)

(58) Field of Classification Search
CPC ......... B65B 43/50; B65B 43/60; B65B 3/323; B67B 3/18; B67B 3/12; B67B 3/2033; B67B 3/2026; B67C 3/2617; B67C 3/26; B67C 3/225; B67C 3/246; B67C 3/22; B67C 3/06; B67C 3/02; B67C 2007/006; F16H 53/08; F16H 53/025; F16H 53/04; Y10T 74/2104; Y10T 74/2102; Y10T 74/2101
USPC .................................................. 141/147–150
See application file for complete search history.

(56) References Cited

U.S. PATENT DOCUMENTS

| | | | | |
|---|---|---|---|---|
| 1,651,903 A | * | 12/1927 | Pennock | B67B 3/2033 53/302 |
| 1,734,529 A | * | 11/1929 | Pennock | B67B 3/2033 53/317 |
| 1,884,916 A | * | 10/1932 | Thompson | B65B 43/60 141/1 |
| 3,400,815 A | * | 9/1968 | Bell | B07C 5/3408 209/531 |
| 3,852,941 A | * | 12/1974 | Bross | B65B 7/2835 53/317 |

(Continued)

FOREIGN PATENT DOCUMENTS

| DE | EP 2384977 A1 * 11/2011 ............. A22C 11/04 |
|---|---|
| GB | 482285 A * 3/1938 ............... B08B 9/20 |

*Primary Examiner* — Daniel D Yabut
(74) *Attorney, Agent, or Firm* — The Watson I.P. Group, PLC; Jovan N. Jovanovic; Vladan M. Vasiljevic

(57) ABSTRACT

A filler cam apparatus having an upward directing portion and an insert member. The upward directing portion having a generally circular configuration, and includes a main body with an upper cam surface extending therealong. The upwardly directing portion includes at least one insert slot. The insert member is releasably attachable to the main body, positionable in the insert slot. The insert member has a body defining a base, an outer surface and an inner surface. The base of the insert member interfaces with the base of the main body. The insert member further includes an upper cam surface including an entry and an exit and a central valley. The entry and exit correspond to opposing portions of the upper cam surface of the main body on either side of the at least one insert slot, with the central valley defining a downward depth.

10 Claims, 3 Drawing Sheets

(56) References Cited

U.S. PATENT DOCUMENTS

| | | | | |
|---|---|---|---|---|
| 4,099,361 A | * | 7/1978 | Dix | B67B 3/18 53/201 |
| 2009/0223169 A1 | * | 9/2009 | Zanini | B67B 3/2033 53/317 |
| 2013/0036860 A1 | * | 2/2013 | Corniani | F16H 53/04 74/568 R |

* cited by examiner

FILLER CAM APPARATUS

CROSS-REFERENCE TO RELATED APPLICATION

NA

BACKGROUND OF THE DISCLOSURE

1. Field of the Disclosure

The invention relates in general to fillers for filling generally rigid and semi-rigid containers, such as bottles, and more particularly, to a filler cam apparatus which includes insert members to effectuate a generally rapid movement to be imparted onto a follower to which the bottle is associated.

2. Background Art

Filler equipment configured to fill containers of various types (i.e., size, shape, material, etc.) of containers are known in the art. Often, these fillers comprise a rotary design wherein a plurality of fill valves are all located equidistantly from an axis of rotation (i.e., in a circle centered on the axis of rotation). The fill valves cooperate with a bottle receiving member. The bottle receiving member receives a bottle, then directs the bottle into proper orientation and contact with a fill valve, then removes the bottle from the filler. To guide the bottle receiving member, often, a cam is disposed around the axis of the filler and a follower is coupled to the bottle receiving member. The bottle receiving member is rotatably mounted on the filler chassis while the cam is generally fixed to the filler chassis. As such, when the filler is operating, the bottle receiving member follower is directed along the cam and movement of the bottle receiving member is transmitted by the cam through the follower.

Often, it is the case that the cam comprises a couple of large sections. While it is generally difficult to replace a portion of the cam or the cam itself, it would be beneficial to be able to alter small portions along the cam to impart a quick movement to the follower. In addition, these quickly imparted movements would be beneficial for particular filler valves, particular bottles to be filled and/or particular fluids that are being utilized.

One area of particular significance or interest is in the area of flow of material through the valve, and especially air lock fill valves (although not limited thereto). Such valves, just prior to closing have fluid in the dispensing portion and also in the vent tube leading away from the dispensing portion. With many fluids, when the valve opens, the fluid in the vent and in the dispensing portion work against each other to resist flow from the dispensing portion into the container. Without a clearing of the vent tube, the flow of the fluid from the dispensing portion is exceedingly slow, gurgled, and/or non-existent. If the vent tube can be cleared, the speed at which the container is filled greatly increases.

It is often enough to impart a relatively quick impulse to the valve to upset the balance of fluid within each of the vent tube and the dispensing portion of the valve. Depending on the type of fluid (viscosity, etc.), it has been difficult to provide enough of a disruption to the valve to clear the vent tube and to initiate dispensing of fluid from the dispensing portion of the valve.

It would be desirable to be able to provide an alteration to small portions of a cam to impart relatively large displacements over a short rotation of the filler.

It would also be desirable to provide for a system by which to easily replace or introduce generally rapid changes in movement (or forces) against a follower which is coupled to a bottle receiver.

It would also be desirable to provide a mechanism by which to impart a shock or movement to the valve to create an imbalance between the vent tube fluid and the fluid within the dispensing portion of the valve, to, in turn, effectuate the clearing of the vent tube and the increased flow of fluid through the dispensing portion of the valve.

SUMMARY OF THE DISCLOSURE

The disclosure is directed to a filler cam apparatus for use in association with a filler for containers. The cam apparatus is mountable to a filler chassis and comprises an upward directing portion, and an insert member. The upward directing portion has a generally circular configuration coinciding with an axis of rotation of a filler. The upward directing portion includes a main body having an outer surface and an inner surface. The main body has, additionally, an upper cam surface extending therealong. The upwardly directing portion includes at least one insert slot along the length thereof.

The insert member is releasably attachable to the main body and is positionable in the at least one insert slot. The insert member has a body defining a base, an outer surface and an inner surface. The base of the insert member interfaces with the base of the main body. The insert member further includes an upper cam surface which has an entry and an exit and a central valley. The entry and exit correspond to adjacent portions of the upper cam surface of the main body on either side of the at least one insert slot. The central valley defining a depth therebetween.

In a preferred embodiment, the insert member is configured so as to be attachable to the main body within the at least one insert slot in two different orientations. In the first orientation the insert member has an upper cam surface corresponding to adjacent portions of the upper cam surface of the main body. In a second orientation the base of the insert member corresponds to adjacent portions of the upper cam surface of the main body, and the upper cam surface corresponds to the base of the main body. In such a manner, where the upper cam surface of the insert member is not required, the insert can be reconfigured so as to match the surrounding cam surface.

In a preferred embodiment, the insert slot includes an entry support wall and an exit support wall spaced apart from each other and extending inwardly from opposing edges of the slot. The entry support wall and the exit support wall are tapered in an upward direction so as to be thinner in the upward direction. Each includes an inner surface for mating engagement with a corresponding first and second wall engagement surfaces on the body of the insert member.

In another preferred embodiment, the first wall engaging surface and the entry support wall each include a first corresponding opening. The second wall engaging surface and the exit support wall each include a second corresponding opening. A pair of fasteners are provided with each fastener extending through a respective one of the first corresponding opening and the second corresponding opening.

In another preferred embodiment, the first wall engaging surface of the insert member abuttingly engages the entry support wall of the main body. The second wall engaging surface of the insert member abuttingly engages the exit support wall of the main body.

In another preferred embodiment, the insert member has a length, the length of the insert member having an arcuate length of between 3° and 10°.

In another preferred embodiment, the at least one insert slot further comprises three insert slots that are spaced apart from each other. An insert member is configured for insertion into each one of the insert slots.

In yet another preferred embodiment, each of the three insert slots are substantially identical in configuration.

BRIEF DESCRIPTION OF THE DRAWINGS

The disclosure will now be described with reference to the drawings wherein.

DETAILED DESCRIPTION OF THE DISCLOSURE

Figure 1:
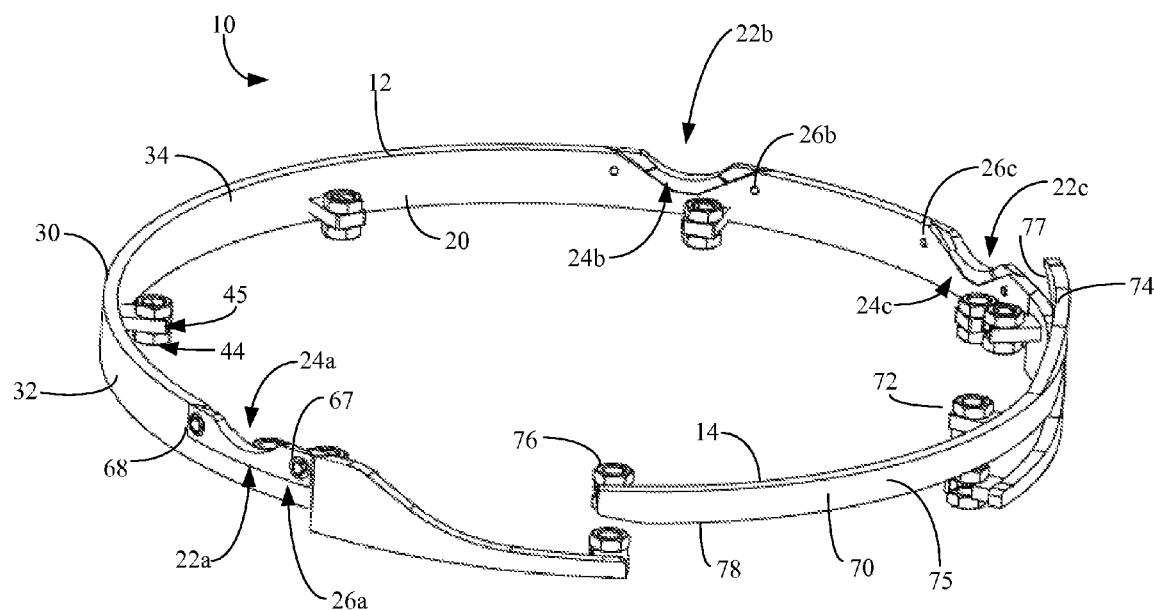
FIG. 1 of the drawings is a perspective view of a filler cam apparatus of the present disclosure which is generally utilized with a filler of rigid and/or semi-rigid containers, such as bottles, and generally fixed to a filler chassis centered along an axis of rotation of bottles to be filled, as well as fill valves.
Figure 2:
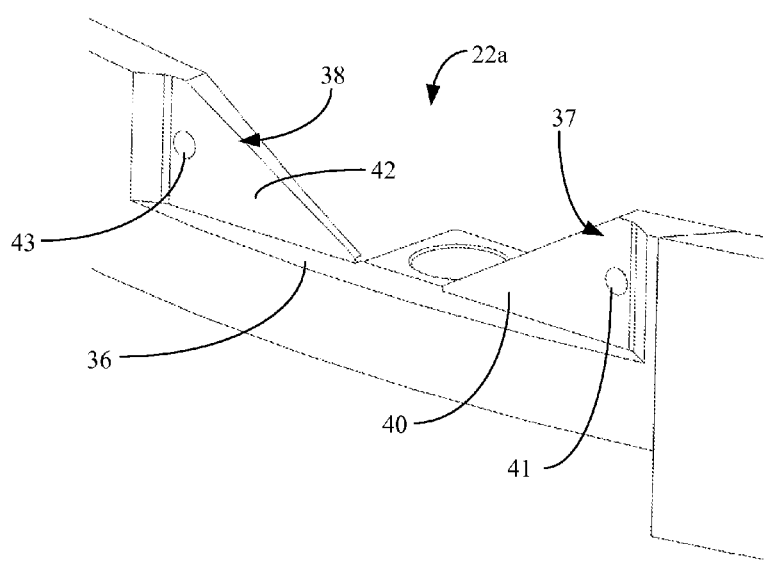
FIG. 2 of the drawings is a partial perspective view of an insert slot of the main body of the upward directing portion of the filler cam apparatus of the present disclosure, showing in particular, the insert slot configuration.
Figure 3:
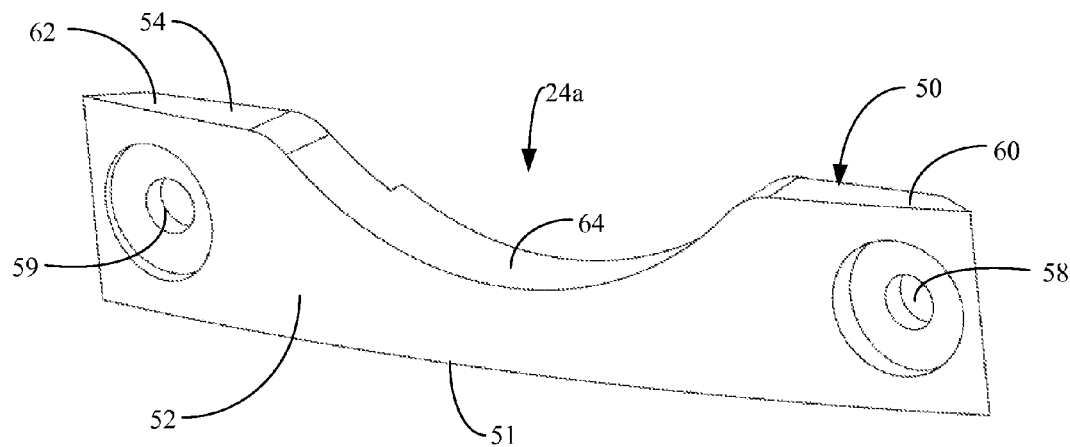
FIG. 3 of the drawings is a perspective view of an insert member of the present disclosure, which is configured for insertion into a corresponding insert slot positioned on the main body of the upwardly directing portion of the filler cam apparatus of the present disclosure.
Figure 4:
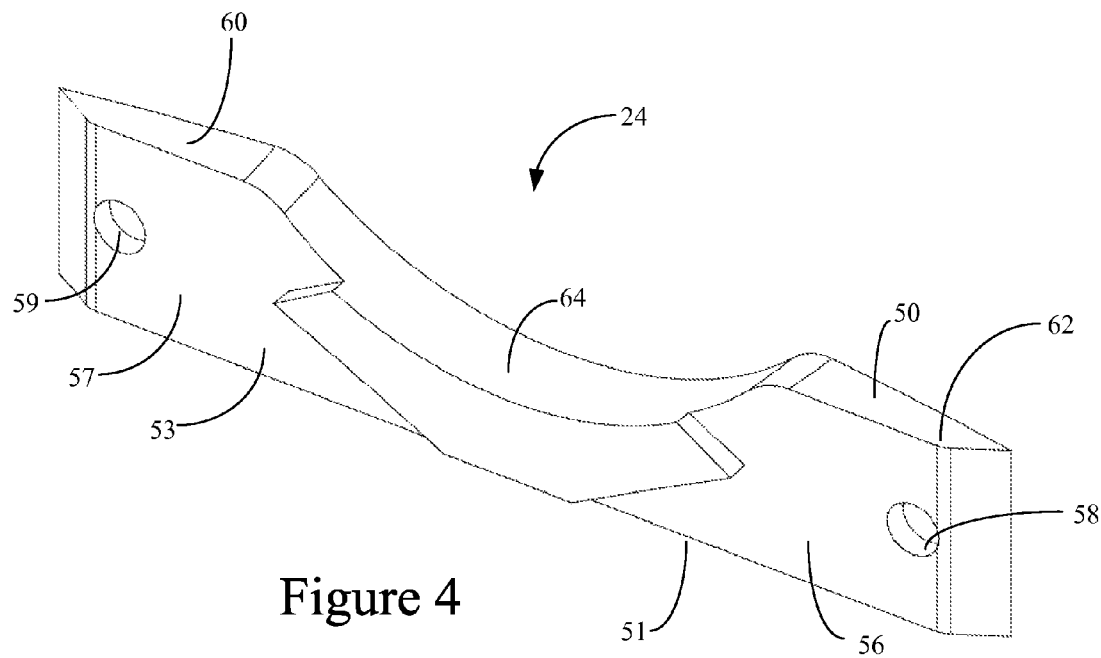
FIG. 4 of the drawings is a perspective view of the insert member of FIG. 3, showing, in particular, the inner surface thereof.
Figure 5:
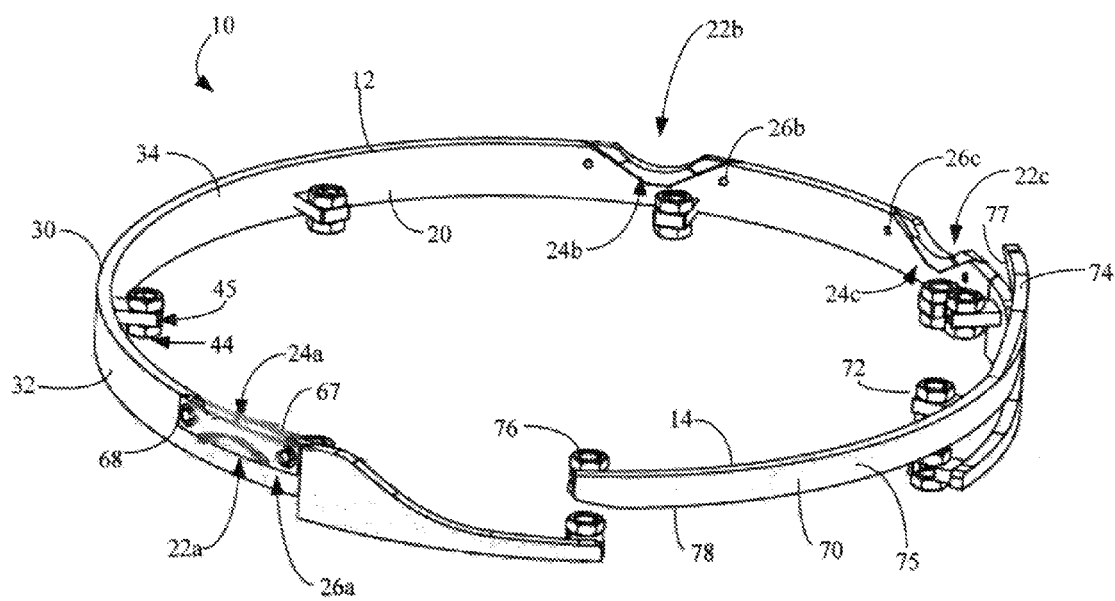
FIG. 5 of the drawings is a perspective view of a filler cam apparatus of the present disclosure showing an insert mounted in a second configuration.

While this invention is susceptible of embodiment in many different forms, there is shown in the drawings and described herein in detail a specific embodiment with the understanding that the present disclosure is to be considered as an exemplification and is not intended to be limited to the embodiment illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, the filler cam apparatus is shown generally at 10. The filler cam apparatus is typically utilized in association with a filler, such as a filler sold under the model numbers F9, F8, F6.3, F4, F5 among others of Fogg Filler Company of Holland, Mich. Of course, the disclosure and the filler cam apparatus is not limited for use in association with such fillers, but they are provided solely for exemplary purposes. In such fillers, the filler cam apparatus is configured to direct the bottle to be filled into the proper orientation for introduction and exit from the filler, as well as into the appropriate position relative to the respective fill valve.

The filler cam apparatus 10 includes upward directing portion 12 and downward directing portion. The upward directing portion 12 is generally concerned with the movement of the bottle relative to the respective fill valve that is to fill the bottle. The downward directing portion 14 is generally concerned with the movement of the bottle into and out of the filler carousel having the fill valves. There may be overlap between the two cams and, as such, both cams may provide movement relative to the respective fill valve and relative to the entry and departure from the filler carousel.

The upward directing portion 12 is coupled to the chassis of a filler (not shown) by way of frame fasteners 44 which extend through flanges 45. The upwardly directing portion 12 includes main body 20, insert slots 22*a* through 22*c*, and insert members 24*a* through 24*c* and insert attachment members 26*a* through 26*c*. In the embodiment shown, a total of three insert members are shown, all positioned at particularly strategic locations. In other embodiments, these may be moved to other locations. Additionally, in other embodiments, fewer or more than three insert members may be utilized.

The main body 20 includes upper cam surface 30, outer surface 32 and inner surface 34. The main body 20 may be formed from a single member, or may include a number of different members that are coupled to each other or to the filler chassis so as to form a single upper cam surface. The main body 20 is generally of a circular configuration and includes a generally uniform diameter along an arcuate length that extends around 280 to 320 degrees. The outer surface and the inner surface are generally spaced apart from each other about the main body in a generally uniform fashion (and typically parallel to each other), so that the main body is of generally uniform thickness.

The insert slot 22*a* will be described with the understanding that insert slots 22*b* and 22*c* are generally identical in configuration and spaced apart from each other along the main body 20 of the upwardly directing portion 12. The insert slot includes base 36, entry support wall 37 and exit support wall 38. The support walls extend from the base 36 and are coupled to each of the sides of the slot. The entry support wall 37 includes an inner surface 40 and an opening 41. The exit support wall 38 includes inner surface 42 and opening 43. As will be understood, the entry support wall and the exit support walls provide support for the insert member laterally to provide stability and so as to limit movement within the slot. The support walls are angled downwardly toward the middle of the slot so as to allow for a number of different profiles of the insert member upper cam surface and so as not to interfere therewith. Thus, they are tapered upwardly, so as to be progressively thinner as extending away from the base.

The insert members 24*a* through 24*c* are each positioned within a respective one of the insert slots 22*a* through 22*c*. The insert members 24*a* through 24*c* are substantially identical in conceptual configuration, while dimensional differences among the different members may exist. In particular, the insert members may be of different lengths, and may include different upper cam surfaces 54 so as to impart a different movement to the follower at different locations along the filling cycle. It will also be understood that, in other embodiments, the insert members may be identical in configuration and generally interchangeable.

Due to the similarity in the conceptual configuration, the insert member 24*a* will be described with the understanding that the remaining insert members are substantially identical. The insert member 24*a* includes body 50 which includes base 51, outer surface 52, inner surface 53 and upper cam surface 54. The general thickness of the insert member is defined by the shape mating configuration of the inner and outer surfaces. That is, the insert member is configured to fit within the insert slot 22a, and generally configured so as to remain stationary therewithin. It is also contemplated that the insert member fits within the insert slot 22a either with the upper cam surface 54 mating with the cam, or flipped so that the base interfaces with the cam. As the base is generally planar, it is contemplated that where the central valley is not required, the planar portion may be extended across the insert slot.

More specifically, the inner surface 53 includes first wall engaging surface 56 and second wall engaging surface 57. Each of the engaging surfaces includes a respective opening 58, 59 extending therethrough. The first wall engaging surface 56 shape matingly follows/matches the inner surface 40 of the entry support wall 37 with the respective openings 41, 58 corresponding to each other. Similarly, the second wall engaging surface 57 shape matingly follows/matches the inner surface 42 of the exit support wall 38 with the respective openings 43, 59 corresponding to each other. Due to the configuration of the inner surfaces of the support walls and the inner surface of the engaging surfaces, a substantial amount of overlapping abutment is achieved to facilitate the integrity of the cooperative insert and upward directing portion 12 so that relative movement or dislodgement is minimized.

It will be understood that the central region between the first wall engaging surface and the second wall engaging surface may be configured so that the insert member can be mounted within the insert slot in two different orientations. A first orientation wherein the upper cam surface corresponding with the upper cam surface of the main body, as shown in the Figures. In the event that the dip or depression is not desired, the insert can be rotated so as to have the base of the insert member corresponding with the upper cam surface of the main body. In that manner, the base is generally planar or of the same shape as the surrounding cam surface of the main body. Each of the insert members can be individually positioned in either orientation, so as to achieve the desired movement of the filler valve and the container (to, in turn, effectuate the flow of fluid into the container).

The upper cam surface 54 is configured so as to be substantially continuous with the upper cam surface 30 of the main body 20 so that abrupt changes or impact bumps are generally precluded. That is, the follower smoothly transitions from the upper cam surface 30 to the upper cam surface 54. The upper cam surface 54 includes opposing entry and exit elevations or ridges 60, 62, respectively, which are separated by central valley 64. The difference between the height of the central valley and the opposing elevations or ridges defines the depth of the cam along the insert member. In the embodiment shown, the depth is generally relatively large over a generally short length of the insert member. Thus, the follower has a relatively abrupt downward and upward movement. The length of the depression or valley usually occurs within 3° to 10° of revolution (i.e., arcuate length of the cam surface). Of course wider inserts are contemplated, however, it is desirable that the downward and upward movement occur within a generally smaller arcuate length.

This abrupt change in direction facilitates the bottle (or filler valve articulating portion in cleaning cycles) to filler valve interaction that is typically not found on a rotary filler, so as to achieve flow of any residual from the vent tube of the filler valve, so as to increase (or permit) flow from the filler valve into the container. Additionally, the desired effect may vary depending on the size of the bottle to be filled, the type of fluid that will be filled and/or the fill valve parameters. As such, it is desirable to have a plurality of different insert members so that an appropriate one of the insert members can be selected for use that imparts the desired movement. Additionally, it may be necessary to have multiple insert members so as to provide the necessary urging of fluid from the vent tube of the filler valve.

The insert attachment members 26a through 26c comprise a plurality of pairs of fasteners, such as fasteners 67, 68 which secure the insert member 24a into insert slot 22a. Similar fasteners couple the remaining insert members 24b and 24c to the respective ones of the insert slots 22b, 22c.

The downward directing portion 14 is shown in FIG. 1 as comprising main body 70 and fasteners 72. The fasteners 72 couple the body (at designated flange portions) to the underlying chassis of the filler. The main body 70 includes entry region 74 and exit region 76. The main body 70 spans the gap of the upward directing portion, and typically is associated with the portion of the cycle that is directed to mounting and dismounting of a bottle that is to be filled. The main body 70 includes lower cam surface 78 as well as inner surface 75 and outer surface 77.

It will be understood that in operation, a follower extends in a circular direction, along an axis that matches the axis of the filler cam apparatus. The follower is directed along the upper cam surface 30 of the upward directing portion and the lower cam surface 78 of the downward directing portion in a substantially continuous cycle. The follower typically includes structures to receive and retain a bottle to be filled. As such, the follower structure receives a bottle, directs the interaction of the bottle with the respective one of the fill valves of the filler, and then directs the dismounting or leaving of the bottle from the filler (in a generally filled condition). It becomes necessary, with certain fluids or flowable materials, and certain types of bottles, to impart a rather abrupt downward and upward movement to achieve the desired flow of material and interface of the fill valve and the bottle to be filled. Generally, such abrupt downward and upward movements are short in duration and occur at particularly desired portions of the cycle while the follower is tracking on the upper cam surface 30. In the embodiment shown, three such regions are contemplated (although the disclosure is not limited thereto).

It is contemplated that a number of inserts may be provided, each one of which may have a different upper cam surface 54 so as to impart a different downward and upward motion to the follower. The user then selects the desired one of the inserts that is appropriate for the filler, the bottle type as well as the fluid that is to be filled. It will be understood that an insert that is generally horizontal or linear may be utilized, where no such dip or downward and upward motion is necessary.

Once the desired insert is selected, from, often a number of different inserts, the user positions the insert member within the insert slot. The configuration of the insert member and the slot is such that a fit with little wiggling around is achieved. In the position, the entry support wall 37 and the first wall engaging surface 56 are in abutment, and, the exit support wall 38 and the second wall engaging surface 57 are likewise in abutment. Further, the openings in each are lined up and ready to receive fasteners. The fasteners are configured so as to intimately pair the two. It will be understood that the entry support wall and the exit support wall are both tapered so as to be thinner at the upper end thereof. Such a configuration aids in the proper seating of the insert member along the base 36 of the insert slot and facilitates improved mating therebetween.

Once inserted and fastened, the filler can be run. It will be understood that when the follower extends along the upper cam surface 30, the follower will tack onto the upper cam surface 54 of the insert member 24a. Initially, the follower extends along the entry ridge 60. Continued movement directs the follower along the central valley, which is lower than the entry ridge 60. The slope to and from the central valley is such (over relatively short radial distance) that a rather quick downward and upward movement is experienced. In a rather short radial distance (approximately 3° to 10° the follower has gone in two directly opposite motions (down and up). Once the exit ridge 62 is reached, the follower is generally at or near the same height as when on the entry ridge 60. The follower then continues along a generally more linear route. Unlike the rest of the upper cam surface of the main body, the insert member upper cam surface 54 has a stronger change of direction in opposite directions. Such a relatively quick movement of the filler valve and container tends to provide an imbalance to the vent tube and promotes the movement of fluid from within the vent tube. The fluid within the vent tube will tend to slow the rate of filling of the container, and may negatively affect the filling of the containers to the desired level.

At any time, the insert member can be removed and replaced with another insert member having a different cam profile, as desired. Additionally, when such a profile is not needed, the insert member can be flipped around so that the base is facing upward and corresponds to the rest of the cam profile.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A filler cam apparatus structurally configured to direct a bottle to be filled in a filler, the filler cam apparatus comprising:
   an upwardly directed portion including:
      a main body having defining a generally circular configuration with an arcuate length, the main body having an upper cam surface; and
      at least one insert slot defined in the main body, the insert slot defining a break in the upper cam surface, the insert slot having a base; and
   at least one insert member, the at least one insert member including an upper cam surface and a base surface opposite the upper cam surface, the at least one insert member positionable within the at least one insert slot in at least two operable orientations, wherein, in a first orientation, the upper cam surface of the at least one insert member corresponds to the upper cam surface of the main body, and wherein in a second orientation, the base surface of the at least one insert member corresponds to the upper cam surface of the main body, with the at least one insert attachable to the main body in either one of the first configuration and the second configuration, to impart a different motion on the bottle.

2. The filler cam apparatus of claim 1 wherein the upwardly directed portion includes a plurality of insert slots defined in the main body, and the at least one insert member comprises a plurality of insert members, with each one of the plurality of insert members structurally configured to be positioned within one of the plurality of insert slots.

3. The filler cam apparatus of claim 2 wherein each of the plurality of insert slots are substantially identical.

4. The filler cam apparatus of claim 3 wherein each of the plurality of insert members are substantially identical.

5. The filler cam apparatus of claim 1 wherein the upper cam surface of the at least one insert member includes a central valley between opposing ends thereof.

6. The filler cam apparatus of claim 5 wherein the base of the at least one insert member is substantially planar.

7. The filler cam apparatus of claim 1 wherein the upper cam surface defines the uppermost surface of the main body of the upwardly directed portion.

8. The filler cam apparatus of claim 1 wherein the upper cam surface on either side of the at least one insert slot is substantially planar.

9. The filler cam apparatus of claim 8 wherein the insert defines an arcuate distance of between 3° and 10°.

10. The filler cam apparatus of claim 1 wherein the upper cam surface of the at least one insert member and the base surface of the at least one insert member do not correspond to each other.

* * * * *